July 1, 1969

J. R. HAYER ET AL 3,453,457

WIDE BAND ACCELEROMETER

Filed April 3, 1967

OUTPUT VS. FREQUENCY

INVENTORS
JOHN R. HAYER
RICHARD DONALD MCGUNIGLE
by: Wallenstein, Spangenberg, Hattis & Strampel
ATTYS.

United States Patent Office 3,453,457
Patented July 1, 1969

3,453,457
WIDE BAND ACCELEROMETER
John R. Hayer, Placentia, and Richard Donald McGunigle, Fullerton, Calif., assignors to Electra Scientific Corporation, Fullerton, Calif., a corporation of California
Filed Apr. 3, 1967, Ser. No. 627,816
Int. Cl. G01p 3/42
U.S. Cl. 310—8.4                                    6 Claims

ABSTRACT OF THE DISCLOSURE

This invention relates to an accelerometer for producing an output voltage whose amplitude varies in accordance with the acceleration.

This accelerometer utilizes mechanical damping in the form of a liquid to dampen the vibrations of the vibratable mass to flatten the output voltage curve and a resistor in series with the output to provide further electrical damping to obtain the desired flat wide band response.

---

This invention relates to accelerometers which produce a voltage in accordance with the virbration or acceleration applied thereto. More particularly, it relates to an improvement in accelerometers of the type most desirably using piezoelectric elements, as the voltage generating element mounted on a vibratable mass which is vibrated in accordance with the acceleration imparted to the test body involved. One such accelerometer is disclosed in U. S. Patent No. 2,808,522 to A. I. Dranetz, granted Oct. 1, 1957.

Undamped accelerometers of the type referred to above have an output characteristic which, for a given acceleration amplitude, progressively increases with frequency, reaching a maximum output at the natural resonant frequency of the vibratable mass and then decaying rather sharply. In many instances it is desirable to have a flat output frequency characteristic over the range of frequencies of interest. Damping of such accelerometers can partially or completely flatten out its output-frequency characteristic. One method heretofore proposed to dampen such accelerometers is the immersion of the vibratable masses thereof in a highly viscous fluid which, if the viscosity thereof is properly selected and the spacing between the vibratable masses and the walls of the housing in which they are carried is held to predetermined close tolerances, provides a near perfectly flat curve over a wide range of frequencies since the damping effect of such a fluid increases with frequency over a limited frequency range. Thus, the use of viscous fluids for flattening the response curve of the accelerometers has a number of disadvantages. In the first place, such fluid damping produces an accelerometer which is critical to adjust for flat frequency response. Thus, each accelerometer must be individually adjusted and calibrated by trial and error method, so the fluid having the proper viscosity is used to effect the flat response referred to. The viscosity of fluid required to flatten the curve over a desired range of frequencies varies with the spacing between the vibratable mass and the walls of the housing carrying the same even when the spacing is held to tolerances of the order of magnitude of plus or minus two ten thousandths of an inch. The use of damping fluids have the additional drawback that internal heating at the higher frequencies causes a market reduction in the viscosity of the damping effect of the fluid which reduces the bandwidth over which a flat or near flat response can be obtained. Of equal significance is the drawback that the accelerometers using the highly viscous damping fluids for flattening the output frequency resposnive accelerometers have a restricted temperature range since the viscosity of the fluid varies with temperature. For example, fluid damped accelerometers frequently have a useful temperature range of the order of magnitude of only ±35 degrees centigrade with respect to room temperature.

It has been discovered that accelerometers can be successfully damped to obtain a flat response over a relatively wide frequency and temperature range by using electrical damping means instead of the fluid damping means referred to. For example, the addition of a resistor of a given value in series with one of the output terminals of an accelerometer of the type described will reduce or eliminate the variation in output of the accelerometer over a frequency and temperature range which is much greater than that usually attainable with fluid damping. Also, individual calibration of each accelerometer is not required as in the case of fluid damped accelerometers because the results of electrical damping is not closely tied to the physical parameters of the accelerometer. Electrically damped accelerometers can, therefore, be made of wider tolerances than fluid damped accelerometers. However, resistance damping means has the disadvantage that the frequency response varies substantially with the capacitive loading, such as the capacitance of the cable attached to the accelerometer. As is usually the case, the output of the accelerometer equipment for measuring the voltage is located at a remote point from the location of the accelerometer on the vibrating object under test. Also, electrical filtering does not significantly reduce the large resonance peaks of the accelerometer response curve as the case of fluid damping. Large resonance outputs can cause undesired and harmful overloading of the accelerometer circuitry where there are vibration components near the natural resonant frequency of the vibratable mass of the accelerometer.

In accordance with one aspect of the present invention, a combination of mechanical and electrical damping is utilized in the accelerometer to overcome at least some and preferably substantially all the aforesaid difficulties. More particularly, a combination of mechanical and electrical damping means are utilized to obtain a flat response over a relatively wide range of frequencies below the natural resonant frequency of the accelerometer and over a wide temperature range. Most advantageously, the electrical means for damping comprises a resistor of suitable value connected in series with accelerometer terminals as in the manner described above. The mechanical damping means most advantageously comprises a damping fluid of much lower viscosity than that normally used in liquid damped accelerometers. For example, a damping fluid having a viscosity of the order of about 10 to 20 centipoises is most advantageously used instead of the order of about 100 to 150 centipoises. In such case, the damping fluid has a limited effect in reducing the response over the desired range of acceleration frequencies for which the accelerometer is designed, but it has a substantial effect in reducing the resonance peak of the response curve. The resistor preferably constitutes the principal response reducing, curve flattening means over said desired range of frequencies and it also reduces the resonance peak of the response curve somewhat.

This combined mechanical and electrical damping means has none of the aforesaid disadvantages of the prior fluid damping and resistance damped accelerometers. Since the damping fluid does not significantly affect the flattening of the response curve over the desired frequency range of operation of the accelerometer, the small variations in the spacing between the vibratable mass of the accelerometer and the walls of the housing is not critical. For example, tolerances in this spacing of the order of magnitude of plus or minus one thousandths of an inch are satisfactory for this purpose and no individual calibration of the accelerometers is necessary for providing a flat response curve. Furthermore, the dynamic range of the accelerometer is extended over what is obtained in the fluid damped accelerometer and the effect of capacitive loading changes on the output frequency response curve is reduced since the presence of the damping fluid reduces somewhat the value of the resistance necessary to flatten out the response curve. A lower value of this resistance reduces the variation in the output of the accelerometer with capacitive loading.

The above and other advantages and features of the invention will become apparent upon making reference to the specification to follow, the claims and the drawings wherein:

Figure 1:
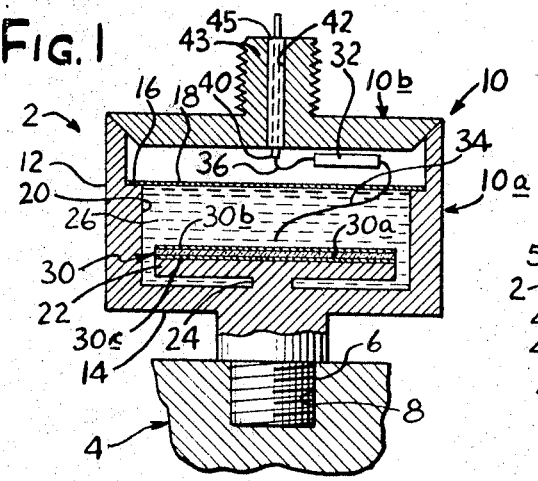
FIG. 1 is a vertical sectional view through a preferred form of accelerometer of the invention mounted on a test body.

Referring now more particularly to FIG. 1, the accelerometer there shown and generally indicated by reference numeral 2 is mounted upon a test body 4 by any suitable means, such as a threaded extension 6 of an accelerometer housing 10 which extension threads into a socket 8 of the test body 4. The housing 10 includes an open top main hollow body portion 10a which preferably has a cylindrically shaped side wall 12 and a flat bottom wall 14 from which the threaded extension 6 projects centrally and axially of the housing. In the illustrated form of the invention, the thickness of the upper portion of the cylindrical side wall 12 is reduced to provide an annular diaphragm mounting shoulder 16. A flexible diaphragm 18 is adhesively or otherwise secured on the annular shoulder 16 so as to sell off a compartment 20 in the main body portion 10a of the housing. The compartment 20 contains a vibratable mass 22, which in the illustrated form fo the invention, is a thin solid cylinder of metal coaxial with the longitudinal axis of the housing 10 and connected to the bottom wall 14 of the main body portion 10a of the housing by a short center post 24. The vibratable mass 22 extends generally parallel to the bottom wall 14 and is closely spaced therefrom by a damping fluid generally indicated by reference numeral 26. The damping fluid 26 fills the compartment 20, and the flexible diaphragm 18 expands and contracts with the expansion and contraction of the damping fluid 26 with variation in temperature of the fluid. The spacing between the vibratable mass 22 and the bottom wall 14 of the housing is not critical and can vary widely. In one case, this spacing was .03 inch.

The vibratable mass 22 carries on the upper or outer surface thereof a piezoelectric member 30 which is preferably disc-shaped as illustrated. The piezoelectric member 30 has a body portion of piezoelectric material (such as barium titanate etc.) which is axially prepolarized and outermost electrodes 30b and 30c. The electrodes 30b and 30c are applied over the flat faces of the body portion 30a of the piezoelectric member, and are soldered or otherwise electrically and mechanically secured to the upper face of the vibratable mass 22. The vibratable mass 22, the center post 24 and the entire housing 10 is preferably made of metal or other similar material so that they constitute a conductor for electrically connecting one of the electrodes 30c to the external circuit.

The open top of the main body portion 10a of the housing 10 is closed by a cover member 10b made of metal or the like. The cover member 10b may be welded, soldered upper portion of the side wall 12 of the main body portion 10a of the housing 10. A space is left between the cover member 10b and the diaphragm 18 in which a damping resistor 32 can be placed. The damping resistor 32 has one lead 34 extending through a sealed opening in the diaphragm 18 and connected to the electrode 30b of the piezoelectric member 10 and another lead 36 extending to a central conductor 40 passing through an opening 42 in an externally threaded metal extension 43 of the cover member 10b. The central conductor 40 is insulated from the threaded extension 43 by a suitable body of insulation 45. It can be seen that the central conductor 40, the insulation 45 and the projecting portion 43 form a male coaxial connector unit to which a conventional female nut carrying connector of a coaxial cable of conventional construction can be connected. The threaded extension 43 of the cover member 10b is in electrical contact with the electrode 30c of the piezoelectric member 30 through the various conductive parts of the housing as described.

Assuming that the piezoelectric member 30 is polarized axially, when the test body 4 is subjected to vibration which has a component axially of the accelerometer, the peripheral portion of the vibratable mass 22 attached to the center post 24 will vibrate and stress the piezoelectric member 30 to thereby generate a voltage which has a polarity and magnitude which is a measure of the direction and magnitude of the acceleration imparted to the vibratable mass 22. In the absence of any damping, the piezoelectric member 30 provides, for a given amplitude of acceleration, an output which progressively increases in amplitude with frequency, as illustrated by curve C1 in FIG. 3. The curve C1 reaches a peak at a given frequency which is the natural resonant frequency of the assembly of the vibratable mass 22 and the piezoelectric member carried thereby.

Figure 2:
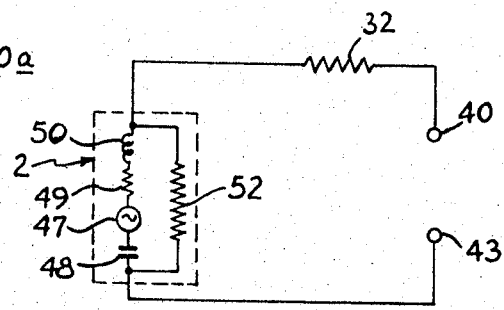
FIG. 2 is an equivalent circuit diagram of the accelerometer of FIG. 1.

FIG. 2 illustrates the equivalent electrical circuit of the accelerometer 2 which circuit includes a series circuit of a capacitor 48, an acceleration responsive generator 47, a resistor 49, and an inductance 50. The equivalent circuit is completed by a parallel leakage resistance 52. At the natural resonant frequency of the accelerometer, the inductance 50 and capacitor 48 form a series resonant circuit which greatly reduces the impedance of the accelerometer 2 which in an undamped accelerometer could produce a very large load current. It is desirable to reduce the magnitude of this current.

The addition of a damping means changes the parameters of the equivalent electrical circuit of the accelerometer 2. Careful selection of the viscosity of the damping fluid and the spacing between the vibratory mass 22 and the bottom wall of the housing 14 can produce the response curve C2 which is relatively flat up to an accelerometer frequency of approximately 9000 cycles per second. Thereafter, the response curve drops sharply except for a peaked portion caused by the natural resonant frequency of the accelerometer. In the example illustrated, the damping fluid has a market effect in reducing the amplitude of the response curve at the resonance point and it also reduces the frequency at which natural resonance occurs.

Figure 3:
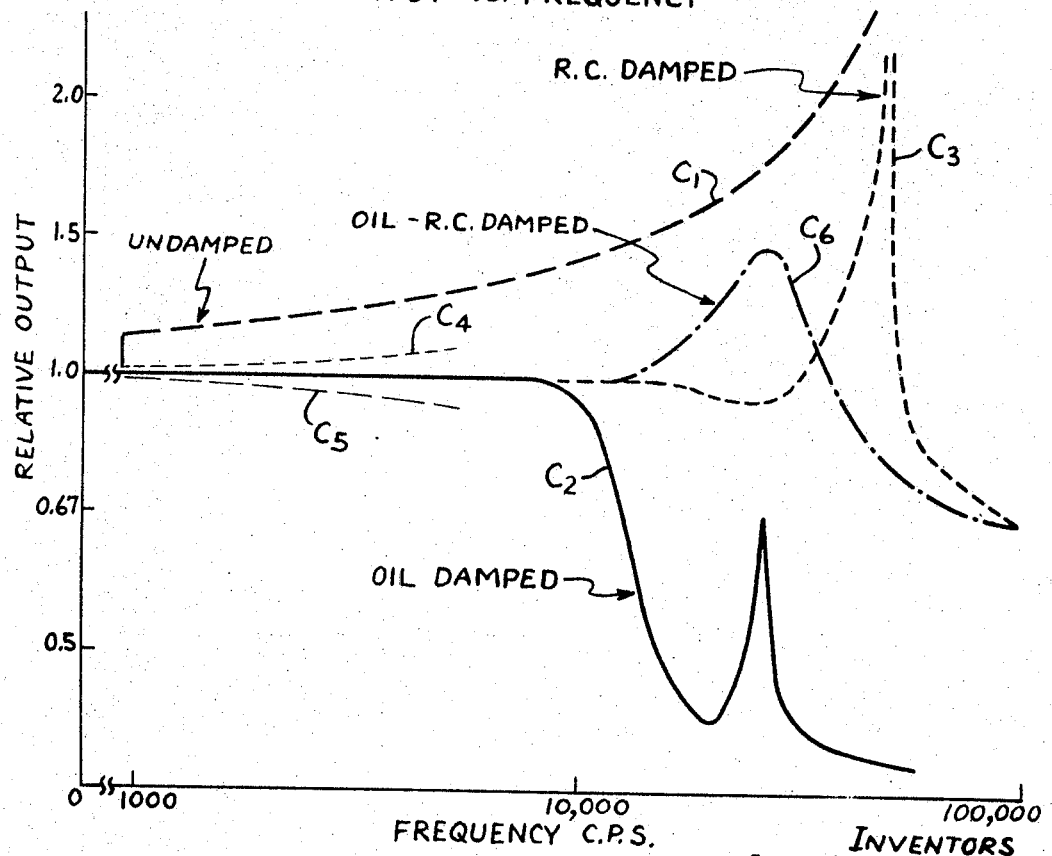
FIG. 3 is a diagram including a number of curves comparing, among other things, the output-frequency response of a fluid damped accelerometer, an electrically damped accelerometer and a combination fluid and electrically damped accelerometer.

In the absence of a damping fluid, the addition of damping resistor like resistor 32 will dampen or reduce the output of the accelerometer with frequency as illustrated by curves C3, C4 and C5 in FIG. 3 where the resistor 32 has three different values. The curve C3 results from the selection of a resistance value which provides a flat response over a frequency range which extends well in excess of 10,000 cycles per second. It should be noted that there is still a substantial peaked response at the natural resonant frequency of the vibratory mass which is undesirable for reasons explained. More importantly, as previously indicated, the presence of the resistor 32 and the absence of additional damping means makes the response curve undesirable dependent upon cable capacitance. If too small a resistance is used, curve C4 results which only partially flattens out the response curve, and, if too large a resistance is used, curve C5 results which is an overcompensated condition where the amplitude of the curve decreases with frequency.

When a combination of electrical and mechanical damping is utilized, most advantageously a combination of resistance and liquid damping as described, a response curve C6 can be obtained. This curve C6 is substantially flat over a very wide band width substantially exceeding 10,000 cycles per second in the specific example being resonance point is reduced to a very modest level, so that for vibration frequencies at the natural resonance frequency of the accelerometer a very modest current will flow in the circuit involved. As previously indicated, when the viscosity of the damping oil is relatively low, such as about 10–20 centipoises in the specific example of the accelerometer being described, the fluid will primarily be effective in reducing the magnitude of the resonance point and will have only a modest effect on the reduction of the slope of the undamped response curve C1 over the desired region of operation of the accelerometer. The resistor 32 will have the predominant effect of flattening the response curve. In such case, all of the disadvantages of the fluid oil damped accelerometers previously described are alleviated, and the advantages of the resistor damping is obtained. Also, the spacing of the vibratable mass 22 from the housing walls does not have to be made to very close tolerances, the accelerometer is useful over wide temperature ranges, as, for example, over the range of from −50 to 125 degrees centigrade, individual calibration of each accelerometer to obtain a flat response is not necessary, and the capacity of the cable connecting the output of the accereometer to an external measuring circuit can vary widely without adversely substantially affecting the output of the response curve over the normally flat regions thereof. For example, in one accelerometer the cable capacity would vary from 100 to 3000 picofarads without substantially affecting the response over the flat regions of the curve C6. A typical load circuit coupled to the accelerometer by the cable may have a resistance of in the neighborhood of 100 megohms and higher with negligible capacitance. The values of the damping resistor 32 may vary widely depending upon the particular accelerometer design involved. For example, a typical range of values in which the damping resistor may fall in the embodiment disclosed in the drawings is between five thousand and twenty thousand ohms. Exemplary values for the electrical parameters of an accelerometer resulting in the curve C6 in FIG. 3 are as follows:

leakage resistance 52—$10^{11}$ ohm
series resistance 49—Negligible
capacitance 48—$1000 \times 10^{-12}$ fd.

It should be understood that numerous modifications may be made in the most preferred form of the invention described above without deviating from the broader aspects of the invention. For example, although the most important application of the invention is in bender or mushroom type accelerometers, it is also useful in shear type accelerometers, as, for example, the accelerometer illustrated in U.S. Patent No. 3,229,128.

We claim:
1. In an accelerometer for producing an output voltage whose amplitude varies in accordance with the acceleration imparted thereto, the accelerometer including an enclosed housing having a pair of output terminals for coupling the voltage generated thereby to a remote external circuit, and a vibratable mass in the housing carrying a piezoelectric body having electrodes coupled to said output terminals and across which a voltage appears which is a measure of the stresses imparted thereto, said accelerometer in the absence of damping means applied thereto having an output verses frequency curve which progressively increases to a large peak at the natural resonant frequency of the vibratable mass, the improvement in damping means for the accelerometer which substantially completely flattens out the output verses frequency curve for a range of frequencies below the natural resonant frequency of the vibratable mass, said damping means comprising: mechanical damping means in said housing for said vibratable mass which means materially dampen the vibrations of said vibratable mass principally in the vicinity of the natural resonant frequency of the vibratable mass, and electrical damping means in series with the output of the accelerometer for providing electrical damping which, in conjunction with a capacitance connected across said output terminals, counter-balances said increasing output with frequency characteristic over said range of frequencies to provide the desired flat response.

2. The accelerometer of claim 1 wherein said mechanical damping means is a damping fluid of relatively low viscosity sealed in said housing about said vibratable mass.

3. The accelerometer of claim 1 wherein said electrical damping means includes resistance means in series with at least one of the output terminals of said accelerometer.

4. The accelerometer of claim 3 wherein the resistor is sealed within said housing.

5. The accelerometer of claim 3 wherein said mechanical damping means is a damping fluid sealed in a compartment in said housing by a flexible diaphragm, said resistor being sealed within said housing outside of the body of damping fluid sealed by said flexible diaphragm.

6. The accelerometer of claim 2 wherein said vibratable mass includes a central support post from which laterally project a mass of material forming with said central post a mushroom-shaped vibratable mass whose peripheral portions are free to vibrate, said piezoelectric body being mounted on the outer axially facing surface of said mushroom-shaped vibratable mass including said peripheral portions thereof so as to be longitudinally vibrated therewith, and said laterally projecting parts of said vibratable mass extending generally parallel and in close proximity to an internal wall surface of said housing and separated therefrom by said damping fluid.

References Cited
UNITED STATES PATENTS

| 3,120,622 | 2/1964 | Dranetz | 310—8.4 |
| 3,104,334 | 9/1963 | Bradley | 310—8.4 |
| 3,170,076 | 2/1965 | Wing | 310—8.4 |
| 3,185,869 | 5/1965 | Shoor | 310—8.4 |
| 3,252,016 | 5/1966 | Hayer | 310—8.4 |
| 3,349,629 | 10/1967 | Eelazar | 310—8.4 |

J D MILLER, *Primary Examiner.*

U.S. Cl. X.R.
73—488; 77—522; 310—8.9, 9.1